US011223207B2

(12) United States Patent
Hinterberger et al.

(10) Patent No.: US 11,223,207 B2
(45) Date of Patent: Jan. 11, 2022

(54) METHOD FOR OPERATING A PLURALITY OF USAGE UNITS FOR A WEAR COMPENSATION IN AN ENERGY SUPPLY DEVICE, AND ENERGY SUPPLY DEVICE

(71) Applicant: AUDI AG, Ingolstadt (DE)

(72) Inventors: Michael Hinterberger, Großmehring (DE); Berthold Hellenthal, Schwanstetten (DE); André Blum, Gaimersheim (DE)

(73) Assignee: AUDI AG, Ingolstadt (DE)

(*) Notice: Subject to any disclaimer, the term of this patent is extended or adjusted under 35 U.S.C. 154(b) by 271 days.

(21) Appl. No.: 16/624,454

(22) PCT Filed: May 18, 2018

(86) PCT No.: PCT/EP2018/063115
§ 371 (c)(1),
(2) Date: Dec. 19, 2019

(87) PCT Pub. No.: WO2018/233958
PCT Pub. Date: Dec. 27, 2018

(65) Prior Publication Data
US 2020/0185922 A1 Jun. 11, 2020

(30) Foreign Application Priority Data

Jun. 23, 2017 (DE) .......................... 102017210616.6

(51) Int. Cl.
*B60L 50/64* (2019.01)
*H02J 3/38* (2006.01)
(Continued)

(52) U.S. Cl.
CPC .............. *H02J 3/381* (2013.01); *B60L 8/003* (2013.01); *B60L 50/40* (2019.02); *B60L 50/64* (2019.02);
(Continued)

(58) Field of Classification Search
CPC .......... B60L 53/53; B60L 53/55; B60L 53/62; B60L 58/22; B60L 50/71; B60L 50/40;
(Continued)

(56) References Cited

U.S. PATENT DOCUMENTS 5,610,802 A   3/1997 Eidler et al.
6,424,119 B1  7/2002 Nelson et al.
(Continued)

FOREIGN PATENT DOCUMENTS

DE   102011054145 A1   4/2012
DE   102013013673 A1   7/2014
(Continued)

OTHER PUBLICATIONS

German Examination Report dated Mar. 2, 2018 in corresponding German Application No. 102017210616.6; 20 pages; Machine translation attached.

(Continued)

*Primary Examiner* — Robert L Deberadinis
(74) *Attorney, Agent, or Firm* — Maier & Maier, PLLC

(57) ABSTRACT

A method for operating an electric energy supply device with a plurality of usage units. Each usage unit is designed to generate or buffer electric energy. A control device is designed to control an exchange of energy between the energy supply device on the one hand and at least one device that is connected to the energy supply device on the other hand. For each usage unit it sets a respective setpoint value for at least one electric operating parameter.

8 Claims, 2 Drawing Sheets

(51) Int. Cl.
*H02J 7/00* (2006.01)
*B60L 8/00* (2006.01)
*H02J 7/34* (2006.01)
*B60L 53/54* (2019.01)
*B60L 53/51* (2019.01)
*B60L 53/53* (2019.01)
*B60L 53/55* (2019.01)
*B60L 53/62* (2019.01)
*B60L 58/22* (2019.01)
*B60L 50/71* (2019.01)
*B60L 50/40* (2019.01)
*H02J 3/32* (2006.01)
*H02J 7/35* (2006.01)

(52) U.S. Cl.
CPC .............. *B60L 50/71* (2019.02); *B60L 53/51* (2019.02); *B60L 53/53* (2019.02); *B60L 53/54* (2019.02); *B60L 53/55* (2019.02); *B60L 53/62* (2019.02); *B60L 58/22* (2019.02); *H02J 3/32* (2013.01); *H02J 7/0048* (2020.01); *H02J 7/345* (2013.01); *H02J 7/35* (2013.01); *H02J 2207/20* (2020.01); *H02J 2300/24* (2020.01); *H02J 2300/30* (2020.01)

(58) Field of Classification Search
CPC . B60L 8/003; B60L 7/34; H02J 7/0048; H02J 3/32; H02J 7/345; H02J 7/35; H02J 2207/20; H02J 2300/24; H02J 2300/30; H02J 3/38; H02J 7/00; H02J 7/34
See application file for complete search history.

(56) References Cited

U.S. PATENT DOCUMENTS

| | | | |
|---|---|---|---|
| 6,522,031 | B2 | 2/2003 | Provanzana et al. |
| 2009/0066291 | A1 | 3/2009 | Tien et al. |

FOREIGN PATENT DOCUMENTS

| | | |
|---|---|---|
| DE | 102013106265 A1 | 12/2014 |
| DE | 102013107767 A1 | 1/2015 |
| DE | 102014200329 A1 | 7/2015 |
| DE | 202014004749 U1 | 9/2015 |
| DE | 102016101789 A1 | 8/2016 |
| DE | 112015003701 T5 | 7/2017 |
| WO | 2013021364 A1 | 2/2013 |

OTHER PUBLICATIONS

International Search Report dated Jul. 5, 2018 and Written Opinion in corresponding International Application No. PCT/EP2018/063115; 17 pages; Machine translation attached.
International Preliminary Report on Patentability dated Jun. 28, 2019 in corresponding International Application No. PCT/EP2018/063115; 28 pages; Machine translation attached.

METHOD FOR OPERATING A PLURALITY OF USAGE UNITS FOR A WEAR COMPENSATION IN AN ENERGY SUPPLY DEVICE, AND ENERGY SUPPLY DEVICE

FIELD

The invention relates to a method for operating a plurality of usage units in an energy supply device. The energy supply device may, for instance, be an electric stationary storage device, for instance based on battery modules or on a vehicle battery for an electric vehicle, such that the usage units are the battery modules of the battery. For an exchange of energy between the energy supply device and at least one device attached to it, a control device sets a setpoint value for each usage unit for at least one operating parameter, for instance for the electric current. The exchange of energy may provide the energy intake or the energy output. Part of the invention is also an energy supply device, capable of executing the method according to the invention.

BACKGROUND

An energy supply device with electric capacitors by way of usage units is known, for instance from U.S. Pat. No. 6,522,031 B2. The capacitors are connected via power bars with a connector for connecting a device or an electric network.

An energy supply device with a plurality of usage units is also known from U.S. Pat. No. 5,610,802 A. The usage units are arranged there on a rack, and can be removed from the rack individually, independently of one another.

From U.S. Pat. No. 6,424,119 B1, an energy supply device is known, in which multiple battery modules are coupled together via a DC bus. A rectified charging voltage can be fed into the DC bus by means of a rectifier in order to charge the batteries. The DC voltage can be converted into a system voltage by means of an inverter for the operation of power supply units.

From DE 10 2014 200 329 A1, an energy supply device is known, in which usage units are arranged in parallel strings, wherein each string comprises some of the usage units. Each string can be connected to a power bar arrangement via a switch unit. Within each string, so-called load balancing for the serially connected usage units in it is required. This means, however, that the usage unit with the greatest wear delimits the electric voltage that can be set for each of the usage units. If one usage unit wears faster than another usage unit, this therefore has an impact on the overall capacity of the energy supply device as well. In other words, the weakest usage unit negatively affects the total service or usage life of the energy supply device.

SUMMARY

The task underlying the invention is to provide a measure for the extension of the total usage or service life of the energy supply device with a plurality of usage units.

The task is accomplished by the subjects of the independent Patent Claims. Advantageous further developments of the invention are provided by the dependent patent claims, by the description below, and by the figures.

The invention provides a method for operating an energy supply device with a plurality of usage units. Each usage unit is generally designed to generate, store, or dynamically redistribute electric energy (for instance: a capacitor). Furthermore, a control device is provided and designed to control the exchange of energy between the energy supply device on the one hand, and at least one device connected or linked to the energy supply device on the other hand. Connected to the energy supply device might be, for instance, an electrically operable vehicle, for the purpose of charging its traction battery. The exchange of energy requires the flow of an electric current in order to transmit electric power. This can be regulated by the control mechanism. For these purposes, the said control device defines or sets for each usage unit a respective setpoint value of at least one electric operating parameter. The setpoint value may, for instance, define the current strength of the current of the usage unit that can be adjusted by means of a current control.

During such an exchange of energy, a usage unit may wear or age. For instance, in a usage unit in the form of a battery module, the internal resistance may deteriorate, in other words increase irreversibly. In order to avoid such wear of a single usage unit from progressing to a degree that would cause the usage unit to fail and consequently the overall operation of the energy supply device to be disrupted, the invention provides as follows: The control device performs the following steps prior to and/or during the said exchange of energy, one time or repeatedly.

The control device determines a wear value for each respective usage unit. The wear value indicates the degrees of wear and tear or the condition of the respective usage unit. Depending on the technology (for instance: battery module or capacitor), such a wear value may represent a different technical variable of the usage unit. Which technical variable is most suitable for describing the wear and tear can be determined by simple trials.

For every usage unit, the respective setpoint value is then determined for the at least one operating parameter (for instance for the operating current) based on the wear value, such that the setpoint value complies with a predefined wear leveling criterion. The purpose of the wear leveling criterion is to level the wear conditions of the usage units. For these purposes, the wear leveling criterion provides that the setpoint values are to be selected such that a difference in the wear of the usage units, as calculated from all the wear values, can at least be kept identical, and possibly even be reduced. This means that the setpoint values for the usage units are set such that a difference in the wear of the various usage units at least does not increase, that is, stays the same or even decreases. The operations of the usage units for the exchange of energy therefore effectuates wear leveling. The wear leveling criterion obviously also provides that by setting the setpoint values, the overall exchange of energy is executed in its entirety. In other words is ensures that as much energy is made available or absorbed as is necessary for the exchange of energy, for instance for a process of charging an electric vehicle.

By setting the setpoint values, one, some, or all usage units may be deployed or utilized for the exchange of energy, by having their respective setpoint values set accordingly. For every other usage unit, the setpoint value may amount to 0. Therefore, if the energy supply device includes a highly worn usage unit and a less highly worn usage unit, the setpoint values for these two usage units are set in such a manner that the less worn usage unit is utilized to a greater degree during the exchange of energy than the usage unit that is already worn. Thus, the latter is protected, whereas the former undergoes greater wear during this exchange of energy. In this way, the overall wear and tear of these two usage units is leveled.

The invention therefore leads to the advantage that the wear values of the usage units are leveled, or when they are already identical, can be kept identical. Thus, a is situation prevented in which a certain usage unit in the energy supply device is worn down to the point of its total failure, while at the same time there remains another usage unit available that is still fully functional and could be utilized for multiple hours of operation. The total failure of the one usage unit might then imply the failure of the entire energy supply device. The described method, on the other hand, leads to a uniform wear of all usage units due to a homogeneous use of the field or the arrangement of the usage units. The result is a wear leveling during the operation of the usage units. This can be considered equivalent to the wear leveling in FLASH storage technology (see internet link https://en.wikipedia.org/wiki/Wear_leveling).

The control device envisioned for executing the method may be provided, for instance, based on at least one microprocessor and/or at least one micro-controller. The steps of the method according to the invention may, for instance, be realized as a program code, designed to have the steps of the method according to the invention be executed by the control device. The program code may be stored in a data storage of the storage device.

Part of the invention are also further developments whose features result in additional advantages.

The wear leveling criterion may be embodied as follows: The usage units utilized are those that have wear value indicating the least degree of wear and tear. In other words, the usage units featuring the least wear and tear are used. The number of usage units that are utilized is such that they are capable of performing the exchange of energy. It is therefore possible to begin with the usage unit with the least wear and tear, after which a next usage unit is selected that has the least wear and tear of the remaining usage units. In this manner, as many usage units are selected as needed for making possible the overall exchange of energy.

In general, a usage unit is an electric source or a sink for the restructuring or redistribution of energy. A further development provides that the usage units respectively comprise at least one battery cell (accumulator cell), in particular a battery cell module or a group of multiple battery cell modules (which might, for instance, be connected in parallel), and/or at least one fuel cell and/or at least one solar panel and/or at least one capacitor generator and/or at least one generator It may also be provided for a usage unit to have multiple battery cells or multiple fuel cells, that is, a stack of fuel cells, or multiple solar cells or multiple capacitors. A usage unit may therefore also be a battery module with multiple battery cells, for instance. A usage unit may also provide a circuit of multiple interconnected battery modules, for instance a string of multiple serially connected battery modules or a string of a serial arrangement of parallel arrangements, wherein every parallel arrangement comprises multiple battery modules in turn.

In other words, at least some of the usage units are adapted for interim storage of electric energy, that is, for instance, by way of battery modules and/or capacitors. In that case, the at least one operating parameter of such usage units comprises at least one the following: a state of charge (SoC), a depth of discharge (DoD), a charge current strength, a discharge current strength, a charging voltage. The state of charge and/or the depth of discharge can be selected as a function of the technology provided in the usage unit, for instance the electrochemistry used. By adjusting the depth of discharge, the so-called swing (stroke during the discharge process) is limited, which has an effect on the service life of a usage unit. A respective setpoint value may therefore determine how strong a usage unit undergoes wear and tear during a given exchange of energy.

The wear value may be calculated as a function of an impedance and/or of an internal resistance. For instance, the wear value may be identical to the impedance or to the internal resistance.

If the usage units are energy storage systems for buffering electric energy, such as battery modules, it is possible that at a given moment, only some of the usage units are charged. If the charged usage units are highly worn-out usage units, these should not be reused at the next exchange of energy; rather, less worn-out usage units should be used instead. A further development provides for this case that prior to an exchange of energy, restructuring energy of at least one usage unit is transferred to at least one other usage unit. In other words, energy storage is restructured within the energy supply device. The at least one usage unit that is discharged and the at least one other usage unit that is charged are selected such that the respective wear value of the usage unit that is discharged indicates greater wear and tear than the respective wear value of the at least one other usage unit that is charged. Since restructuring can be done in a more protective manner than the actual exchange of energy, for instance because more time is available for it, the at least one usage unit that is discharged can be discharged in a more protective manner than would later be the case for the at least one other usage unit during the actual exchange of energy with the at least one attached device. In addition or in the alternative, restructuring allows for the adherence to a depth of discharge predetermined by a setpoint value.

Up to this point, measures have been described for concentrating wear during a specific exchange of energy on such usage units whose wear and tear so far is the lowest. However, the invention also provides for additional protective measures for protecting the usage units overall, independently of their degree of wear, in other words: to prevent wear and tear more generally.

A further development provides that when setting the respective setpoint value for the usage units, the wear leveling criterion also take into account a protective condition for every usage unit, in other words, a predefined condition. The protective condition may be that each usage unit be operated with an individual operating profile, provided for a respective technology. In other words, even in the event that the usage unit is deployed or utilized for the exchange of energy, it is operated based on its technology according to a predefined individual operating profile. Depending on the technology, the individual operating profile may determine or specify the energy and/or power level and/or the current and/or the voltage over time. An individual operating profile may thus dictate, for instance, the movement of the current over time. In addition or in the alternative, the protective condition may specify that a difference from a predefined ideal charge condition is maintained that is less than a predefined maximum difference. In other words, the said swing, that is, the difference between the maximum state of charge and the minimum state of charge is kept smaller than a predefined maximum difference. For instance, the charging and discharging of the usage unit may vary within a range from $+X\%$ to $-Y\%$ around the ideal charge condition, wherein X, Y may be in the range of 10% to 30%. The ideal charge condition may be, for instance, 50% of the storage capacity.

In a further development, another protective measure is that the energy supply device comprise more usage units than needed for the exchange of energy. A total of the individual capacities of the usage units is therefore greater than a nominal capacity of the energy supply device. The nominal capacity may, for instance, pertain to at least one of the following parameters: storage capacity, maximum performance. A usage unit or a subset of the usage units can then [be] determined or selected based on excess capacity by application of a capacity criterion. The selected usage unit or subset of usage units will then remain unutilized during the exchange of energy. In other words: they will not participate in the exchange of energy. The capacity criterion may, for instance, pertain to the so-called load balancing for battery modules or capacitors, by which all serially connected usage units are set to a common single voltage value. The single voltage value must be the lowest single voltage of the individual serially connected usage units. The weakest usage unit thus delimits the maximum possible single voltage of every other usage unit. If this usage unit with the lowest single voltage is subsequently removed such that it remains unutilized, each remaining usage unit can be set to a higher single voltage. An additional advantage resulting from the provision of the said excess capacity, leading to a greater gross capacity of the energy supply device than the (externally) specified nominal capacity, is the following: a certain electric capacity must be made available for the exchange of energy. Since the gross capacity of the energy supply device is now greater than the nominal capacity, the overall nominal capacity that the energy supply device can provide is smaller than the total of the nominal capacities of the individual usage units. When more usage units are operated than minimally required for the exchange of energy, none of the usage units has to be operated at its individual nominal capacity; they can be operated at less than their individual nominal capacity, while the total nominal capacity at the output terminals of the energy supply device is maintained. In other words, the total of the individual nominal capacities of the usage units is greater than the nominal capacity of the energy supply device.

In order to be able to operate usage units with of different setpoint values, it must be possible to connect or link them independently of one another with an external device. A further development provides that some of the respective usage units are combined to form branch circuits, here respectively referred to as strings. The usage units of such a string are serially connected. The serial arrangement of the string is connected in turn at an end of the string with a DC/DC converter. At least [one] end of the string (preferably: both ends) is respectively connected with a power bar arrangement via at least one galvanically isolatable switch unit, via which power bar arrangement the exchange of energy with the at least one attached external device is conducted. Thus, the serial arrangement of a string with the power bar arrangement can then be optionally connected by means of the at least one switch unit, and the current strength of an electric current flowing from the string into the power bar arrangement can then be controlled or regulated by means of the DC/DC converter. In order to be able to make a targeted selection of usage units for the exchange of energy within the serial arrangement of each string as well, and to keep other usage units unutilized, a bypass circuit is provided for every usage unit within each string. In order to adjust the respective setpoint value of the at least one operating value of the selected usage units by means of the DC/DC converter the control device will then control the current of the string. Furthermore, the at least one switch unit of each string is controlled by the control device as well in order to connect the string to the power bar arrangement or to disconnect it from it to begin with. The bypass circuits of each string are controlled by the control device as well.

Overall, the control device is thus able to select the usage units individually, to bypass the other usage units electrically, and to set or adjust the current of the usage units by means of the DC/DC converter. Preferably, the DC/DC converter is a buck converter.

BRIEF DESCRIPTION OF THE DRAWING

Part of the invention is also an energy supply device that can be operated according to the method. This means that it features multiple usage units, each of which designed to generate or buffer electric energy. A control device of the energy supply device is designed to execute an embodiment of the method according to the invention. In the said manner, the control device may feature at least one micro-controller and/or at least one microprocessor for these purposes.

In the following, an exemplary embodiment of the invention will be described. For these purposes.

The exemplary embodiments described below are preferred embodiments of the invention. In the exemplary embodiments, the described components of the embodiments respectively are individual features of the invention that should be considered independently of one another, respectively being further developments of the invention even independently of each other, and which must therefore be deemed part of the invention also individually or in a different combination as the one shown. Furthermore, the described embodiments can also be complemented by other features of the invention than among those described above.

DETAILED DESCRIPTION

In the figures, functionally analogous elements are respectively marked by the same reference numbers.

Figure 1:
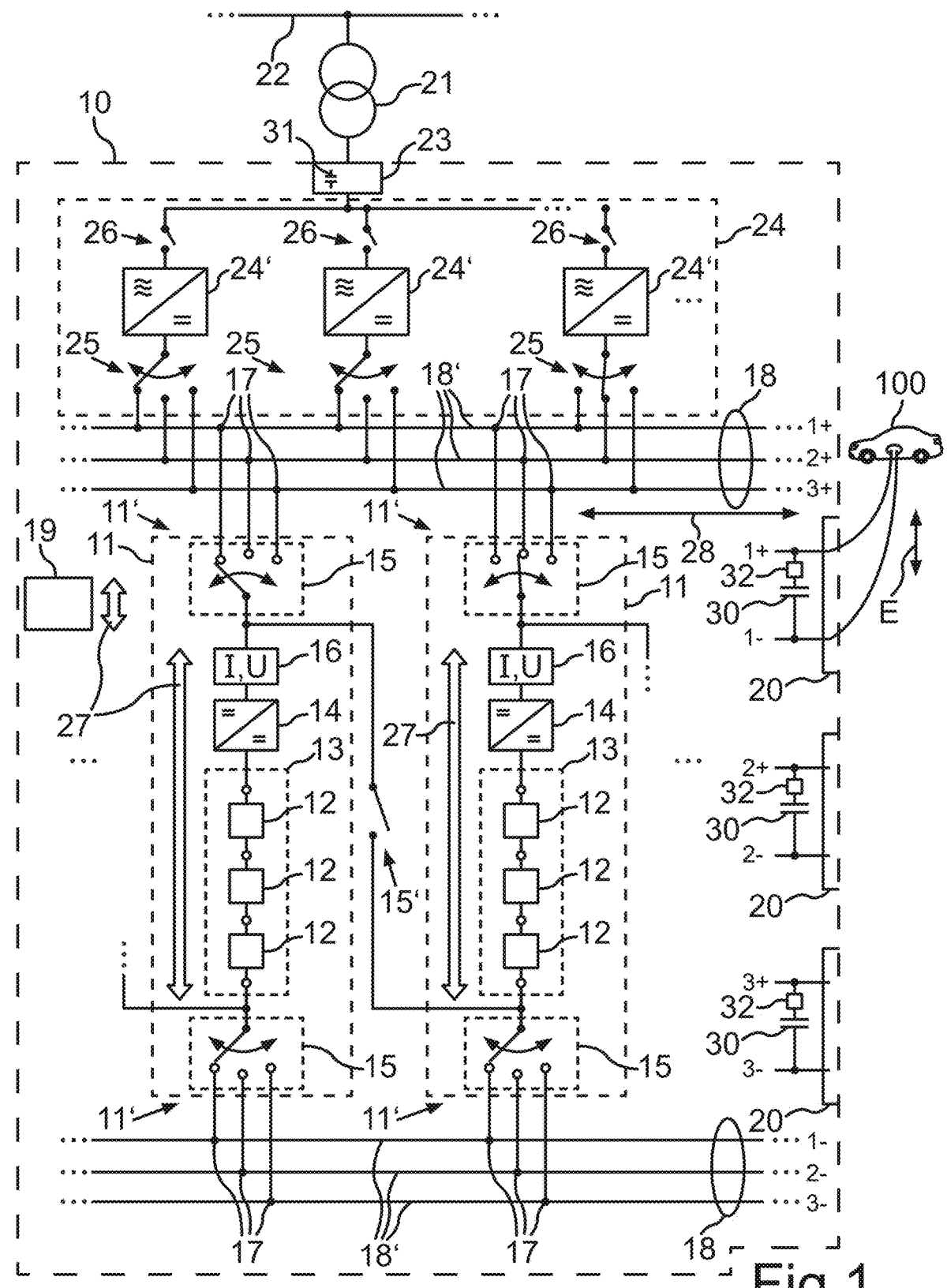
FIG. 1 shows a schematic representation of an embodiment of the energy supply device according to the invention.

FIG. 1 shows an electric energy supply device 10, which may be embodied as an energy storage system, as a pure energy source, or as a combination thereof. The energy supply device 10 may be provided, for instance, in the form of a stationary storage device for electric energy. It may be built, for instance, at a road network. At least one device 100, for instance an electrically powered motor vehicle, can then be connected to the energy supply device 10 in order to charge a traction battery of the motor vehicle by means of an exchange of energy E. The energy supply device 10 may also be provided for use as a mobile battery, traction battery, or solar storage device. For instance, an electric machine of a traction propulsion system may be attached to the energy supply device by way of a traction battery. In a charged condition, the energy supply device 10 may supply at least 1 kW of electric output and/or deliver at least 1 kWh of electric energy.

Multiple branch circuits or strings 11 can be provided in the energy supply device 10 for the exchange of energy E, wherein every string 11 may comprise a serial arrangement 13 of respectively several of the usage units 12. The usage units 12 are therefore combined in the energy supply device 10, in other words, in a vehicle traction battery or in an electric stationary storage device, for instance. The energy supply device 10 may feature an enclosure, in which the strings 11 and the power bar arrangement 18 are arranged.

Every usage unit 12 may respectively comprise an electric energy storage system and/or a pure source for electric energy. By way of an energy storage system, a usage unit may comprise, for instance, an electrochemical battery cell or a battery cell module with multiple battery cells, or a capacitor or an arrangement of capacitors. Examples for battery cells are those featuring lithium ion, lead, or solid state technology. Examples for suitable capacitors are double layer capacitors (so-called supercaps (R)) with a capacitance of preferably at least 1 mF, in particular at least 100 mF). Respectively examples for a pure source are a fuel cell and a solar cell. By way of an energy source, a usage unit 12 may comprise a fuel cell or a stack of fuel cells, for instance, or a solar cell or a solar panel or a generator, such as a power plant (for instance of a pumped-storage power plant). For a current increase, a usage unit 12 may also feature a parallel arrangement of multiple battery cells or of battery cell modules, for instance.

Within each string 11, the technology used by the usage units 12 is uniform, in other words, only battery modules or only solar cells are provided, for instance. Every string 11 therefore features usage units 12 with identical technology, that is, for instance, battery cell modules each with a lithium ion accumulator. However, combined technologies may be provided by different strings 11. Thus, the energy supply device may be adapted to a specific purpose or to a required operating profile. For instance, for the use of an energy supply device 10 in a motor vehicle as a traction battery, two strings with different technologies may for instance be provided, for instance with an apportionment of the number of the usage units 12: 80% energy cells (large storage capacity), 20% power cells (more expensive, but with a greater power flow).

As shown in FIG. 1, per string 11, in addition to the serial arrangement 13 of usage units 12, the following may be provided as well: a DC/DC converter 14, a respective mechanical switch unit 15 at the string ends 11', a measuring device 16 for a string current strength I and/or a voltage measurement device for detecting a total voltage or a string voltage U of the string 11.

Every DC/DC converter 14 may be embodied in a conventional way. In general, the DC/DC converter may a boost converter, a buck converter or a buck-boost converter. Every DC/DC converter 14 may in particular be a buck converter. Every switch unit 15 may be embodied as a mechanical switch, and is in particular galvanically isolatable. Every switch unit 15 may feature multiple ON/OFF protectors or (as shown in FIG. 1) a protector embodied as a toggle switch (1-to-N multiplexer). By means of each switch unit 15, the respective string ends 11' can be galvanically connected to and disconnected from string connectors 17, alternatingly. Every string connector 17 represents an electrical connection to a power bar 18'. The combined power bars 18' form a power bar arrangement 18 consisting of independent power bars 18'. Every string connector 17 of a string 11 may be connected with another power bar 18' of the power bar arrangement 18. Per string end 11' (plus pole and minus pole), therefore, multiple string connectors 17 can be provided in order to connect the string 11 to multiple different power bars 18' of the power bar arrangement 18, and alternatingly disconnect it galvanically from each of the power bars 18'. The opening of the two switch units 15 of a string 11 therefore allows for it to be galvanically disconnected or even exchanged without disrupting the operations of the energy supply device 10.

Each string 11 can provide a total voltage or DC voltage U at the string connectors 17 by means of the serial arrangement 13. The DC voltage U may be a DC voltage (HV) of more than 60 V, in particular of more than 100 V. However, it might may also be provided for the DC voltage U to be in the range of 8 V to 60 V. When a string 11 is galvanically connected with two power bars 18', there is therefore a DC voltage between them. Every string 11 may be galvanically connected alternatingly with a respective pair of power bars 18 by means of its switch units 15. The string 11 may be galvanically connected alternatingly with a respective pair of a power bars by means of the switch units 15 by connecting a string end 11' with one respective power bar 18' of the pair of a power bars, such that the DC voltage U at the pair of a power bars drops.

The measuring unit 16 may also provide the said total voltage measurement over the string 11 in order to record the DC voltage U. The measuring unit 16 is preferably arranged downstream from the DC/DC converter 14, as shown in FIG. 1, in order to allow for voltage regulation by means of the DC/DC converter 14. As will be complained in the context of FIG. 2, an individual voltage measurement is provided in every usage unit 12 as well.

The at least one device 100 can be connected with the strings 11 via the power bar arrangement 18. The power bars 18' of the power bar arrangement 18 thus form a power bar matrix, via which, optionally at least one selected string 11 can be electrically connected with a selected device 100, while at the same time, a different device can be electrically connected with at least one different strand 11. The devices remain galvanically isolated from each other.

Which string 11 is to be electrically connected with which power bar 18' can be determined by a control device 19. For these purposes, the control device 19 may determine a respective power requirement and/or a respective output requirement of the at least one connected device 100, and then select at least one string 11, by means of which the demand can be met. The demand can be communicated by the device 100 itself, for instance via a communication interface, or it may be stored, for instance, as a predetermined fixed value in the control device 19. The control device 19 may then connect the switch units 15 of each selected string 11 with the power bars 18 that lead to the connected device 100.

A respective additional switch unit 15' may be provided between two respective strings 11 in order to serially connect two strings 11 and therefore to combine their string voltage. Thus, between two power bars 18', a greater voltage made be made available than what can be generated by an individual string 11.

The power bars 18' may respectively be connected in pairs with an output terminal 20, to which a respective device 100 may be connected. The connections of the power bars 18' with the individual electric contacts of the output terminals 20 are [marked] in FIG. 1 by the respective labels 1+, 2+, 3+, 1−, 2−, 3−, wherein "+" may represent a plus potential and "−" a minus potential or mass potential. The designations symbolize three possible pairs of a power bars 1+, 1− and 2+, 2− and 3+, 3−, wherein an additional switching device, not shown, can also be embodied connectably with the electric contacts of the output terminals 20, alternating with various of the power bars 18'. The output terminals 20 can therefore always remain galvanically isolated from each other, as long as every power bar 18' of a connector 20 is galvanically connected with another string 11.

A simultaneous charging and discharging of different strings 11 may also be provided, for instance in order to supply a device 100 with electric energy from consecutive different strings 11 that are then recharged in the meantime. For instance, a charging process of an electric vehicle (or of a device in general) may be done via a pair of a power bars with an output voltage of 400 V, for instance, while simultaneously, other strings 11 may be charged, for instance by way of a transformer 21 at a charging voltage of 800 V, for instance, from a supply grid 22 or from another energy source external to the device. The transformer 21 may be connected to an input terminal 23 of the energy supply device 10. If the strings 11 are not designed for this charging voltage, they may be serially connected by means of the switch unit 15'. The galvanic isolation then follows through the utilization of different power bars 18' for the respective strings 11 and/or every voltage (output voltage and charging voltage, such as 400 V and 800 V).

The strings 11 may also lead to a power concentration in that at the input terminal 23, an energy source, for instance a solar plant, by way of a first performance, inputs energy into at least one string 11, whereupon the string 11 transfers this energy by way of a second performance, which is greater than the first performance, to a device 100 connected to an output terminal 20.

By way of a stationary storage device, the energy supply device 10 may optionally feature for the input terminal 23 a modularly constructed AC/DC converter arrangement 24 with multiple AC/DC converters 24' that can be individually switched between the power bars 18' by means of a switch unit 25 in order to allow for providing a predefined current strength and/or charging voltage for a charging current on a power bar 18' or for galvanically isolating respective AC/DC converters 24' from the power bar arrangement 18. By means of additional switch units 26, a galvanic isolation of the input terminal 23 is possible as well. The switch units 25, 26 may respective by formed by a contactor. The switch units 25, 26 may be controlled by the switching device 19. The opening of the two switch units 25, 26 of an AC/DC converter 24' allows for it to be galvanically disconnected or even exchanged without disrupting the operations of the energy supply device 10. The switch units 25, 26 are therefore isolation switches. The AC/DC converters 24' may be embodied to be galvanically isolating. However, the AC/DC converter arrangement 24 does not necessarily have to feature galvanically isolating AC/DC converters 24'. Other converters are more cost-effective. The galvanic isolation may be ensured at all times by means of the mechanical switch of the strings.

Instead of the supply grid 22, an energy source independent of the grid, such as an emergency power generator or a wind power plant [may] be connected to the input terminal 23. Conversely, the energy supply device 10 itself may be grid-forming, in other words, it might provide a power frequency to other devices connected to the input terminal. This is particularly advantageous for the use of the energy supply device 10 in an area without a supply grid 22 of its own. AC devices may be operated without adjustment, as on a public supply grid. The opposite of grid-forming operation is grid-following operation, meaning synchronization with a predetermined power frequency.

In order to switch the switch units 15, 15', 25, 26 and the usage units 12 and to receive data from the usage units 12, the control device 19 may be connected with these components by means of a communication device 27. The communication device 27 may comprise a communication bus, for instance, such as a CAN (Controller Area Network) bus or an Ethernet.

Thus, the control device 19 accumulates general know-how about what can be switched and how, for instance, which power bar 18' can be switched to what string 11. The control device 19 may be embodied at least partially as a central control device for all strings 11 and/or at least partially as a distributed control device per string 11. It may feature a processing device with at least one micro-controller and/or at least one microprocessor. When executed by the processing device, an operating program of the processing device may be adapted to perform the described procedural steps for operating the energy supply device 10.

Optionally capacitors 30, 31 (in particular double layer capacitors) may be provided at the output terminals 20 and/or at the input terminal 23 in order to buffer peak loads. The usage units 12 can therefore be operated at peak loads (for instance with a duration in the range of up to 3 sec. or 5 sec.) in a more protective manner, since the peak load is attenuated. A peak load may be an electric capacity greater than the sum of the individual nominal capacities of the connected usage units 12, in particular a capacity greater than 1.2 times that sum.

For a switching process at the power bars 18', a restructuring circuit or a limiting circuit 32 (switch and resistive element) can be arranged serially with the respective capacitor 30, 31 in order to conduct a capacitor current via the resistive element, thus limiting the current strength of the capacitor current to a predefined maximum value. The limiting circuit 32 may be used for the charging and discharging of the respective capacitor 30, 31. A capacitor 30, 31 with his limiting circuit 32 forms a capacitor device. The limiting circuit 32 is therefore a precharging circuit.

A cooling of the strings 11 (in particular the usage units 12 in the strings 11) may, for instance, take place in a rack by arranging a cooling region underneath the string region.

Every power bar 18' may be made out of aluminum or copper. Aluminum is the more cost-effective material, and it is lighter than copper. Due to a specific resistance, aluminum generates a power loss (more so than copper), from which heating power for temperature control of the usage units 12 (in particular of battery cells) can be generated, which can be transmitted from the power bars 18' to the usage units 12 via a thermal connection, for instance a cooling circuit.

In case of a power distribution with multiple strings 11 at a power bar 18', the setting or regulating of the individual string current I via the DC/DC converter 14 of the string 11 can adjust the current strength I, for instance by aligning or dynamically repositioning it. Thus, for instance, the distribution of the required total current strength for the device 100 can be distributed over N strings 11, for instance. N=3, and every string 11 can generate a current strength I specifically for it, for instance 50%, 25%, 25% when N=3.

This allows for taking into account the technology of the usage units 12 available in the respective string 11, so that the usage units 12 can be operated within their specification. Since the electric voltages U can be determined, the current I can then be set by means of the DC/DC converter 14, so that for instance compensation currents flow between the strings 11 that are smaller than a threshold value are. Thus it can be ensured, for instance, that in case of batteries, per battery cell, a current I of up to 300-400 will only flow for 15 sec., whereas a permanent current would only flow up to 150 A. Every string 11 can therefore be operated according to its own operational strategy, adjusted to its technology. A suitable current strength I can be set by means of the DC/DC converter 14.

In addition or in the alternative, the current strength I of the respective string 11 may be set by the control device 19 as a function of the lengths of the lines 28 of the power bar segments leading from one string 11 to an output terminals 20 (that is, to a consumers) by means of its DC/DC converter 14 in order to set the distribution of the current strengths I for multiple strings 11 that are connected in parallel as a function of the lengths of the lines 28 and as a function of the consequently resulting losses, such that the losses can be optimized (for instance minimized or maximized for heating) and/or locally distributed. A string 11 with a shorter length of the feed line 28 via the power bars 18' may be assigned a greater current strength I for minimization than a string 11 with a greater line length 28. Thus, the effect of different line lengths is compensated for. The current strength I may also be set as a function of a real-time temperature of the line segments. With such a power management, the disadvantage of the higher specific resistance of aluminum can be compensated for by defining and adjusting the current strength on individual line segments.

If necessary, the control device 19 can therefore switch the combined strings 11 with the currently required property to the used power bars 18 that lead to the output terminal 20 at which the power level is tapped by a connected device 100. Every string 11 can be connected as needed by means of its switch units 15. Every string 11 can be drained or charged individually. In addition or in the alternative, the efficiency of the DC/DC converter 14 within the string 11 can be optimized by setting its input voltage by selecting and connection usage units 12. The DC/DC converter 14 of each string 11 can therefore perform two tasks. It limits the string current I to a pre-definable setpoint value so as to allow the operation of usage units 12 in accordance with their specified specifications (operating limits). The voltage U of the string 11 can be aligned with the power bar voltage. Thus, the compensating currents between multiple strings 11 can be reduced. Additionally, the DC/DC converter 14 ensures that a predetermined target voltage is applied at the strand connectors 17, independently of the number of the usage units 12 actively operated in the string 11.

A current measurement 16 for the string current I can be done in the measuring unit 16 in the string 11 in the manner described, and is necessary anyway for the regulation of the DC/DC converter 14.

The central control device may also reconfigure each string 11 individually from within, in other words, connect and disconnect in the serial arrangement 13 the usage units 12 of the string 11. If, for instance, the string voltage U is less than a required voltage of the connected power bars 18', more usage units 12 can be connected in the serial arrangement 13 of the string 11. This may be done so rapidly by means of semiconductor switches (for instance transistors) that it can be done during a switching pause of the DC/DC converter 14.

Figure 2:
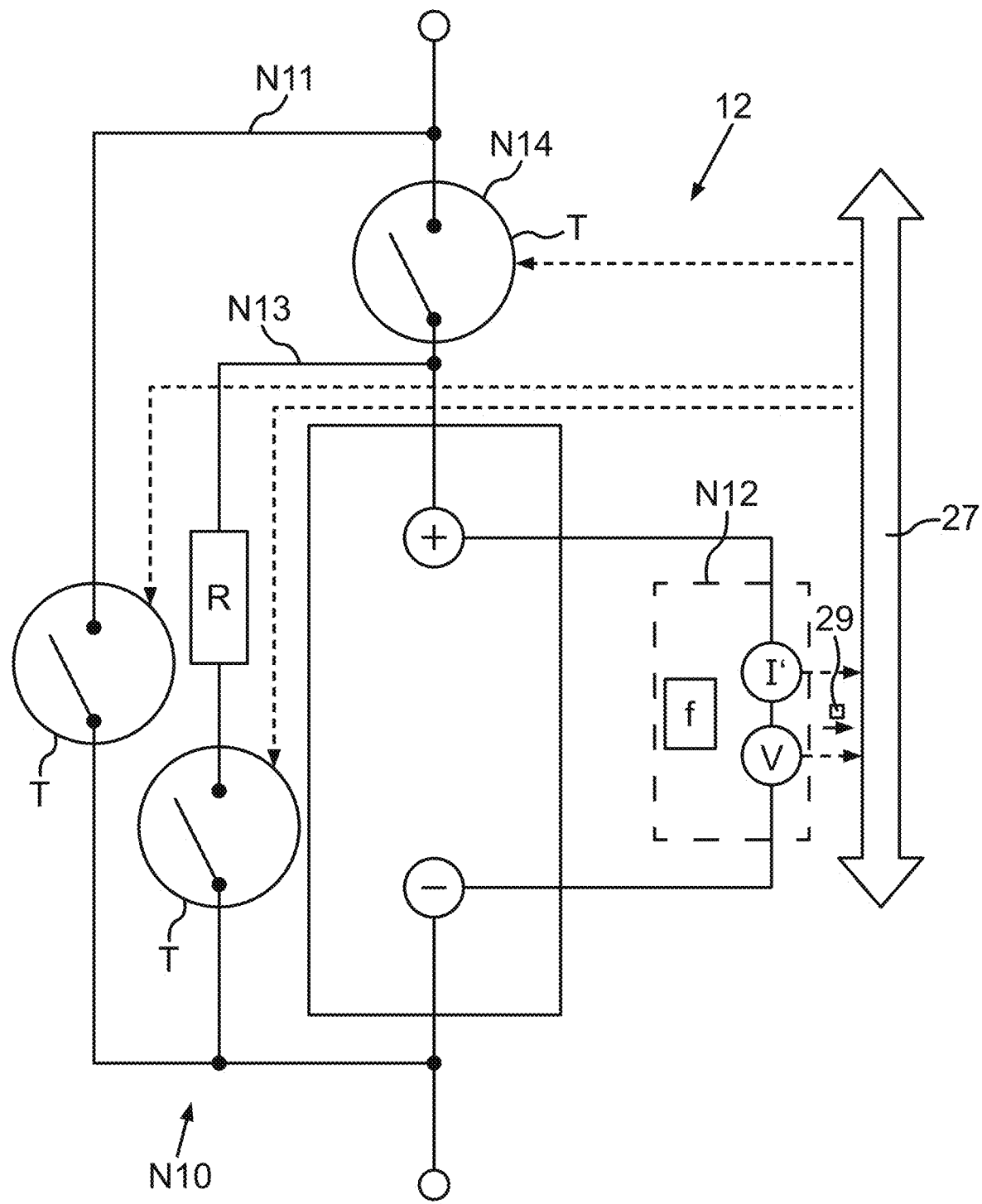
FIG. 2 shows a schematic representation of a usage unit of the energy supply device of FIG. 1, having a bypass circuit.

In this regard, FIG. 2 shows how each usage unit 12 can be electrically bridged, electrically isolated, and/or discharged by an individual switching device N10. For these purposes, semiconductor switch T (transistors) are thus provided. Every usage unit 12 may provide by way of functions: a bridging or bypass circuit N11, a diagnostic unit N12, a (in particular passive) load balancing or discharge circuit N13, a separation or isolation circuit N14. A semiconductor switch T only has to be able to block one low voltage, for instance 2× the single voltage V of the usage unit 12. Load balancing may also be done actively in the conventional manner (so-called active load balancing). In addition to the switch for the isolation circuit N14, an additional switch may be provided for the second, opposite pole as well (all-pole switching). The diagnostic unit N12 may be designed in the conventional manner for cell analysis, for instance for impedance measuring, for instance by means of impedance spectroscopy. For impedance spectrum analysis (0 Hz to 3 kHz, for instance), the diagnostic unit N12 can determine per usage unit 12 for these purposes a measuring current I' and a single voltage V at multiple frequencies f, which results in the impedance course for the frequency f. This is shown in an impedance spectrum. The diagnostic unit N12 can signal a present status value 29 of a measuring current I' and/or of the single voltage V and/or of the measured impedance via the communication device 27 to the control device 19. The meaning of the "impedance" concept in the context of the invention is a impedance value for a predefined frequency, for instance 0 Hz, or an impedance course for the frequency f. Multiple frequencies can be monitored in a frequency sweep by means of a gradual increase or decrease. In the alternative, multi-frequency excitation at multiple frequencies at the same time is possible. The multi-frequency excitation may be embodied, for instance, as multi-sinus excitation or as a square wave signal or as a step signal.

Every usage unit 12 thus be monitored individually, for instance with respect to its SoH (State of Health; its wear condition) and/or its SoC (State of Charge; its capacity to supply power) and/or its SoF (State of Function; its output capacity). The SoH and SoC and SoF parameters as such are known from prior art.

Regardless of impedance measuring, the single voltage V of the usage unit 12 can also be measured without the AC voltage of impedance measuring. A usage unit 12 that is bridged (by means of the bypass circuit N11) may be monitored with respect to its single voltage V as well. Prior to connecting (closing N14 or switching it electro-conductively), the single voltage V of the usage unit 12 can be individually adjusted by means of load balancing N13. Optionally, an electric charging unit may be provided per usage unit 12 as well, capable of individually charging the usage unit 12 even when the semiconductor switch of the isolation circuit N14 is open (every usage unit 12 can therefore be charged individually). The power supply of the charging unit may, for instance, be via the communication device 27 (for instance by means of power-over-Ethernet technology) or by means of a galvanically isolated power supply unit.

Mutual locking of N11 and N14 may be provided (for instance software-based or by means of a logic circuit) to prevent short circuiting.

Additionally, a temperature measurement by the diagnostic unit N12 or, for instance, by the control device 19, may provide a conclusion about the temperature from the impedance.

The control device 19 therefore has access to every individual usage unit 12 via the communication device 27. The condition of every usage unit 12 can be read, and the switching device N10 of every usage unit 12 can be controlled, in particular, the bypass circuit N11 in combination with the isolation circuit N14. By the combined switching of the bypass circuit N11 and the isolation circuit N14, a usage unit 12 in the serial arrangement can be alternatingly connected or disconnected.

On that basis, the wear or condition of every usage unit 12 can be determined centrally in the control device 19 (for instance in the form of impedance as wear value), and the switch position of every usage unit 12 can be set as a function of the condition determined. Individual usage units 12 can be electrically removed from the string 11 (bridging N11), added (serial switching), discharged individually (discharge resistor R, balancing circuit N13), temporarily isolated electrically (opening N14/electrically blocking), for instance for the diagnostic unit N12.

This makes it possible to respond to different wear or individual parameter distributions of the usage units 12 in the string 11: Preferentially, only usage units 12 are actively operated with similar parameter values. The similarity may be defined by a similarity criterion, which specifies, for instance, a maximum difference of at least one parameter, wherein the difference may be in a range of 10% to 100% (double/half). An old or weak usage unit 12 are [sic] bridged or switched off first. This may be detected by a capacity criterion, which may refer, for instance, to the impedance or be defined by the similarity criterion being violated. The capacity criterion therefore excludes usage units 12 that are too weak. The connection of old usage units 12 or of a weak usage unit 12 becomes possible again later when the string conditions apply, in other words, when the other usage units 12 are also worn-out to such extent that the similarity criterion is met again.

The similarity criterion allows for reducing the necessity of load balancing. The performance per usage unit (the current I in the string is equal, but when voltages are different, this produces a different performance, leading to a local build-up of heat, and therefore to aging and wear) may be adjusted in advance, for load balancing requires an adjustment to the "weakest" usage unit, that is, one generating the lowest voltage, in other words, it must be reduced to the lowest voltage. If identical or similar operating conditions are generated in advance by means of the similarity criterion, less balancing is necessary. Therefore, if for instance the single voltages V=4.1 volt and V=3.9 volt are present in a string, balancing should be an adjustment to the weakest usage unit, in other words, to 3.9 volt. The internal resistance measurement (impedance spectroscopy) makes it possible to detect the weakest usage unit (with the greatest internal resistance) (capacity criterion) and be disconnected from the string 11 (Bridging N11). However, the impedance is just one example for the identification of a weak usage unit. In general, detection of the weakest usage unit is possible based on a condition of the usage unit.

By means of an electric disconnection or separation N14 of all usage units 12 of a string 11, the string 11 may also be switched HV-free. All usage units 12 are disconnected from each another. In this safe mode, the string 11 can be saved, for instance for an assembly, for failure protection, for an emergency, or for transportation. The switching sequence is important: First, the mechanical switch units 15 (protectors) are opened, next the usage units 12 are disconnected N14 in order.

The control device 19 may also provide wear leveling of the individual usage units 12. Wear leveling provides for the homogeneous use of the field or the arrangement from usage units 12. The result is wear leveling during the operation of the usage units 12. An example for this could be the wear leveling from FLASH storage technology (https://en.wikipedia.org/wiki/Wear leveling).

An advantage of wear leveling is the extension of the total service life of the energy supply device 10, since the probability of failure of individual usage units 12, as can be caused by above-average wear of a single usage unit 12, is reduced.

The addition or removal of energy, in other words, the exchange of energy E with a connected device 100, is done by means of the usage units 12 whose turn it is, based on wear leveling. For these purposes, for every usage unit 12, a present wear condition is specified by way of a wear value. The purpose of these measures is uniformity of wear. The wear value may be represented, for instance, by the impedance of the usage unit 12. The wear value indicates the degree of wear of the usage unit 12.

A respective setpoint value of at least one operating parameter, for instance of the current I during discharging and/or of the single voltage V during charging, may be determined for every usage unit 12 as a function of the wear value, based on a wear leveling criterion, wherein the wear leveling criterion provides that by adjusting each setpoint value, one or some or all usage units 12 combined perform the exchange of energy E in its entirety, while keeping the difference of the wear of the usage units 12 as calculated from all the wear values at a minimum. This means that the wear of the usage units 12 is adjusted in the course of the exchange of energy E in that usage units 12 with a stronger degree of wear are utilized less than usage units 12 with less wear. As a result, the latter wear stronger, such that their wear condition is adjusted to those of the usage units 12 that utilized less.

The wear value changes during operation, and faster so if the usage unit 12 is operated at an operating point deviating from an ideal condition (the usage unit will continue to wear). For this reason, protective measures are expedient.

Preferably, the usage units 12 are only operated within a tolerance interval around an ideal charge condition, which may, for instance, be a 50% state of charge, and/or define a current profile of an electric current of the usage unit 12 that flows during the exchange of energy.

In general, the ideal condition depends on the technology of the usage unit used, and known in prior art. The ideal condition may be defined in battery modules by the following parameters:

SoC—State of Charge (energy content)—the ideal condition may be 50%, for instance;

DoD—Depth of Discharge (current profile)—the ideal state of charge of 50%, minus a maximum of 20% (tolerance interval), for instance.

The specified ideal values depend on the electrochemistry and/or the application provided, and are to be determined for the respective concrete energy supply device by the person skilled in the art.

In general, the DoD should remain "low", in other words, not drop too far.

The farther the present operating point is removed from the ideal condition, the faster the wear value will increase. The present operating point can be set by setting the charging or discharging current I for the usage units 12 respectively. The AC/DC converter arrangement 24 can be used for adjusting the charging current, and the DC/DC converter 14 can be used for adjusting the discharging current. In this, the wear conditions or wear values of all usage units are to be leveled.

A further protective measures is the following: An excess capacity at the usage units 12 can be set. Without an additional switch, an excess capacity at the usage units 12 can distribute the load. This results in a lower load per usage unit 12, since all usage units always included in order to achieve uniform wear. Furthermore, the service life is extended also due to the reduced load, for when per string, for instance at a capacity of 110% (the total of the individual capacities of the usage units 12 in the string) only 100% (nominal value) are demanded, with a reduction by the control device 19, this results in a lower peak load per usage unit 12. The string 11 might, for instance, deliver a greater voltage than needed, meaning that a smaller current I is needed for the same power output than in case of a utilization of only 100% [of the] nominal value (nominal capacity). An example: 12 usage units are available, but a nominal value of only 10 usage units is nominally provided.

Without a switch, 12 usage units must be connected, but electronically, only the capacity of 10 usage units is demanded (no switch needed!). Thus, weaker usage units are possible, since their peak currents are smaller, specifically due to the resulting higher string voltage U, since more usage units are serially connected than the number that is nominally available. The utilization of cheaper usage units [is therefore] possible.

If switches are available, for instance the semiconductor switches T, the cycling of the usage units 12 of a string 11 may be provided, for instance, by always providing 10 usage units (providing the nominal capacity) and bridging 2 usage units.

The provision of an excess capacity of usage units 12 means that the total of the individual nominal capacities of the usage units 12 (in other words: their combined gross capacity) is larger than the externally available nominal capacity. This allows for compensating a failure of a usage unit. Thus, the power supply device 10 may be provided, for instance, as an energy storage system (for instance as battery storage) with a proven or nominal capacity (for instance 100 kWh). In fact, internally, a gross capacity is provided that is greater than the externally provided nominal capacity (an actual gross capacity of 110 kWh, for instance, which is greater than the net capacity, for instance of 100 kWh). In other words, more usage units (such as battery cell modules) are available than needed for providing the nominal capacity.

For instance, only so many usage units for discharging are made available externally as needed to correspond to the nominal capacity. These usage units are therefore "active units". The other storage units (that are not actively used) are "reserve units".

According to a bad block management (BBM), defective or worn-out active units are identified and taken out of service. This means that in case of a failure or defect of an active unit, this defective active unit can be taken out of service, and a reserve unit (that has been an inactive usage unit up to this point) can be operated as a new active unit. Thus, despite the failure of a usage unit or of multiple usage units, the nominal capacity is preserved. The concept of bad block management (BBM) is taken from Flash memory technology (https://en.wikipedia.org/wiki/Flash_memory#Memory_wear).

During standard operation, rotating or cycling (for instance according to the round robin algorithm or more generally according to a predefined swapping algorithm) the usage units is possible in order to achieve uniform wear of all usage units. If the reserve unit is then activated to compensate for a failed active unit, the reserve unit will already have similar electric properties as the other active units, since it will already have a similar degree of wear (in the meaning of the aforementioned similarity criterion). This may reduce the degrees of necessary load balancing as described.

Based on the division of usage units into active units and reserve units, usage units can be swapped during maintenance even while the energy storage system is in operation, without negatively affecting the nominal capacity. Usage units in need of being swapped can be set aside as reserve units or taken out of service and then be removed or replaced (dynamic swapping of usage units).

Bad block management and/or swapping can also be done collectively or at the string level, in that a group of usage units 12 or the entire serial arrangement 13 of a string is switched and/or swapped. Bad block management is also possible within a usage unit 12. Thus, for instance, a usage unit 12 designed as a battery module may comprise multiple battery cells, for instance 12 battery cells, in a triple serial arrangement of 4 battery cells arranged in parallel. This allows for swapping or bridging a respective parallel arrangement.

With respect to charging management for the strings, the following may be provided:

Via the power bars 18, [subject missing] can be interconnected by means of the DC/DC converter 14 in order to exchange energy. A string 11 can thus be charged via multiple sources, for instance 40 kW from another string 11 and 10 kW from a network AC/DC converter 24', in order to provide a power output of 50 kW.

In terms of power output, a load profile can be smoothed or leveled, for instance by having some strings 11 supply the consumers while other strings 11 are already charging in order to be available for the subsequent charging process. A simultaneous charging at 10 A and discharging at 20 A is possible, for instance (at least one string 11 would charge the device 100, and at least one other string 11 would be charged from the supply grid 22). It is also possible to generate a boost current (short-term peak, for instance of more than factor 1.5) by connecting a string 11.

The (thermal or electric) stress of the individual strings 11 can be limited by having different alternating strings 11 supply a connected device 100 (for instance charge an electric vehicle). The said DoD (Depth of Discharge) can thus be limited, for instance to 20%.

By means of the mechanical switch units 15 on each string 11, a full galvanic isolation between the strings is also possible if they are switched to different power bars. This is the precondition for simultaneously charging multiple devices 100 (for instance electric vehicles). Each electric vehicle is connected to a different power bar 18', which is galvanically isolated from the remaining power bars.

Overall, the examples show how the invention makes it possible to apply a wear leveling method to an energy supply device.

The invention claimed is:

1. A method for operating an electric energy supply device having a plurality of usage units, wherein each usage unit is designed to generate or buffer or dynamically redistribute electric energy, and wherein a control device is designed to control an exchange of energy between the energy supply device on the one hand and at least one device that is connected to the energy supply device on the other hand, in that for each usage unit it sets a respective setpoint value for at least one electric operating parameter, the method comprising: the control device prior to the exchange of energy and/or in the course of the exchange of energy once or repeatedly:

determines for each usage unit a respective wear value of the usage unit, the wear value indicating a wear of the usage unit calculated as a function of an impedance and/or an internal resistance of the usage unit, determines for each usage unit the respective setpoint value of the at least one operating parameter based on a wear leveling criterion, the wear leveling criterion providing that by adjusting each setpoint value, at least one usage unit combined perform the exchange of energy in its entirety, thereby maintaining or reducing a difference of the wear of the usage units that was calculated from all wear values, wherein prior to the exchange of energy, restructuring energy is transferred from at least one usage unit to at least one other usage unit, wherein the respective wear value of the at least one usage unit prior to the transmission indicates greater wear than is indicated by the respective wear value of the at least one other usage unit.

2. The method according to claim 1, wherein the wear leveling criterion provides that those of the usage units that have wear values indicating a lowest degree of wear be used, and that a number of the usage units be used as needed to perform the exchange of energy.

3. The method according to claim 1, wherein the usage units comprise of at least one battery cell, at least one fuel cell, at least one solar panel and at least one capacitor.

4. The method according to claim 1, wherein at least some of the usage units are adapted to buffer electric energy, and the at least one operating parameter of these usage units comprises one or more of the following: a state of charge SoC, a depth of discharge DoD, a charge current strength, a discharge current strength, and a charging voltage.

5. The method according to claim 1, wherein while determining the respective setpoint value by the wear leveling criterion, a certain condition for each usage unit is taken into account, the certain condition providing that a) each usage unit be operated with a predefined individual operating profile that is specific for a respective technology of the usage unit, and/or b) a difference with respect to a predefined state of charge is maintained that is less than a predefined maximum difference.

6. The method according to claim 1, wherein more usage units are provided in the energy supply device than needed for the exchange of energy, with one usage unit or a subset of the usage units being selected based on a certain criterion to remain unutilized during the exchange of energy.

7. The method d according to claim 1, wherein some of the usage units are respectively combined to form branch circuits, each branch circuit being connected with a power bar arrangement by a DC/DC converter and at least one galvanically isolatable switch unit, a bypass circuit being provided within each branch circuit for each usage unit, the energy supply device performing the exchange of energy via the power bar arrangement, and the control device for regulating the at least one operating value controlling the DC/DC converter and the at least one switch unit and the bypass circuits of each branch circuit.

8. An energy supply device with multiple usage units, each of which is designed to generate or buffer electric energy,
  wherein a control device of the energy supply device is adapted to execute a method according to claim 1.

* * * * *